United States Patent [19]

Rennell, Jr. et al.

[11] Patent Number: 4,851,165
[45] Date of Patent: Jul. 25, 1989

[54] METHODS OF AND APPARATUS FOR COATING OPTICAL FIBER

[75] Inventors: John A. Rennell, Jr., Doraville; Carl R. Taylor, Lawrenceville, both of Ga.

[73] Assignee: American Telephone and Telegraph Company AT&T Bell Laboratories, Murray Hill, N.J.

[21] Appl. No.: 92,117

[22] Filed: Sep. 2, 1987

[51] Int. Cl.$^4$ .............................................. B29C 47/02
[52] U.S. Cl. ..................................... 264/1.5; 264/174; 264/514; 425/111; 425/112; 425/113; 425/133.1; 427/163
[58] Field of Search ...................... 264/1.5, 174, 514; 427/163; 425/111, 112, 114, 113, 133.1

[56] References Cited

U.S. PATENT DOCUMENTS

| | | |
|---|---|---|
| 3,479,053 | 7/1973 | Timson . |
| 3,735,729 | 5/1973 | Bird . |
| 4,154,879 | 5/1979 | Choinski . |
| 4,409,263 | 10/1983 | Aloisio et al. . |
| 4,455,159 | 6/1984 | Lamb et al. ......................... 427/163 |
| 4,474,830 | 10/1984 | Taylor . |
| 4,480,898 | 11/1984 | Taylor . |
| 4,512,944 | 4/1985 | Astfalk et al. . |
| 4,532,151 | 7/1985 | Stenlund . |
| 4,613,521 | 9/1986 | Smith, Jr. ........................... 427/163 |
| 4,704,307 | 11/1987 | Jochem et al. ...................... 427/163 |

Primary Examiner—James Lowe
Attorney, Agent, or Firm—Edward W. Somers

[57] ABSTRACT

An optical fiber (21) which has been drawn from a preform (22) is moved into and through a chamber (38) of a housing. A source of vacuum is connected to the chamber to prevent the attachment of air pockets to the optical fiber as it is being moved through the chamber and through an opening of a die. The die includes a flow path (55) which is substantially normal to the path of travel of the optical fiber and the die opening is substantially larger than the diameter of the optical fiber. The thickness of the flow path in a direction along the path of travel is sufficiently small so as to prevent the recirculation of the coating material in the vicinity of the point of application to the optical fiber. Also, the fiber draw rate, the pressure of the coating material the direction of the flow path relative to the longitudinal axis of the optical fiber and the diameter of the die opening are such that a gap forms between the coating material and the die. That gap is allowed to be maintained because of the pressure differential between ambient atmosphere an the chamber. As a result, the coating material as it leaves the disc-like flow path and is directed toward the optical fiber is bounded by free surfaces instead of by solid surfaces in the immediate vicinity of where it is applied to the optical fiber. This prevents the development of shear fields and allows the diameter of the coated optical fiber to be varied.

24 Claims, 4 Drawing Sheets

METHODS OF AND APPARATUS FOR COATING OPTICAL FIBER

TECHNICAL FIELD

This invention relates to methods of and apparatus for coating optical fiber. More particularly, it relates to methods of and apparatus for applying single or multiple layers of coating materials to optical fiber substantially without the occurrence of bubble entrainment in the layers of coating materials.

BACKGROUND OF THE INVENTION

In the manufacture of optical fiber, a glass preform rod which generally is manufactured in a separate process is suspended vertically and moved into a furnace at a controlled rate. The preform softens in the furnace and optical fiber is drawn freely from the molten end of the preform rod by a capstan located at the base of a draw tower.

Because the surface of the optical fiber is very susceptible to damage caused by abrasion, it becomes necessary to coat the optical fiber, after it is drawn, before it comes into contact with any surface. Inasmuch as the application of the coating material must not damage the glass surface, the coating material is applied in a liquid state. Once applied, the coating material must become solidified rapidly before the optical fiber reaches the capstan. This may be accomplished by photocuring, for example.

Those optical fiber performance properties which are affected most by the coating are strength and transmission loss. Coating defects which may expose the optical fiber to subsequent damage arise primarily from improper application of the coating material. Defects such as large bubbles or voids, non-concentric coatings with unacceptably thin regions, or intermittent coatings must be overcome. The problem of bubbles in the coating material has been recognized for some time. One solution is to use a pressurized coating material which is fed upwardly ina coating applicator to strip bubbles from the optical fiber. Intermittent coating is overcome by insuring that the fiber is suitably cool at its point of entry into the coating applicator to avoid coating flow instabilities. Coating concentricity can be monitored and adjustments made to maintain an acceptable value. When it is realized that the coating thickness may be as much as the radius of an optical fiber, it becomes apparent that non-concentricity can cause losses in splicing, for example.

Optical fibers are susceptible to a transmission loss mechanism known as microbending. Because the fibers are thin and flexible, they are readily bent when subjected to mechanical stresses, such as those encountered during placement in a cable or when the cabled fiber is exposed to varying temperature environments or mechanical handling. If the stresses placed on the fiber result in a random bending distortion of the fiber axis with periodic components in the millimeter range, light rays, or modes, propagating in the fiber may escape from the core. These losses, termed microbending losses, may be very large, often many times the intrinsic loss of the fiber itself. The fiber must be isolated from stresses which cause microbending. The properties of the fiber coating play a major role in providing this isolation, with coating geometry, modulus and thermal expansion coefficient being the most important factors.

Two types of coating materials are used commonly. Single coatings, employing a relatively high modulus, e.g. $10^9$ Pa, or an intermediate modulus, e.g. $10^8$ Pa, are used in applications requiring high fiber strengths or in cables which employ buffer tubes where fiber sensitivity to microbending is not a significant problem.

The problem of coating optical fibers becomes more complicated because of the functions the coating material must perform. Dual coated optical fibers increasingly are becoming used to obtain design flexibility and improved performance. Typically, a first or primary coating layer that comprises a relatively low modulus material, e.g. $10^6$–$10^7$ Pa, is applied to the optical fiber. Such a material reduces microbending losses associated with the cabling, installation or environmental changes during the service life of the optical fiber. An outer or secondary coating layer comprising a relatively high modulus material is applied over the primary layer. The outer coating layer is usually of a higher modulus material to provide abrasion resistance and low friction for the fiber and the primary coating layer. This structure isolates the fiber very well from external stresses which would tend to cause local bending. Such stresses may be imposed in two distinct ways. First, non-uniform lateral stresses, imposed by the cable structure surrounding the fiber, may cause bending with periodic components in the microbending regime. The dual coating serves to cushion the optical fiber via the primary layer and to distribute the imposed forces via the secondary layer, so as to isolate the optical fiber from bending moments. Secondly, axial compressive loading of the optical fiber occurs when the surrounding cable components contract relative to the fiber. Such contraction results from both the differential thermal contraction of cable materials relative to the glass fiber and from the viscoelastic recovery of residual orientation present in the cable materials. If the axial compressive load imposed on the optical fiber becomes large enough, the fiber will respond by bending or buckling. The low modulus primary coating is effective in promoting long bonding periods for the fiber which are outside the microbending range.

In one method of applying dual layers of coating materials to a moving optical fiber that is disclosed in U.S. Pat. No. 4,474,830 which issued on Oct. 2, 1984, in the name of C. R. Taylor, an optical fiber is passed through a coating applicator which includes first and second dies. The first die confines a first coating liquid which is maintained at a predetermined level in a reservoir above the first die over a portion of the fiber's length. A second coating liquid is applied onto the optical fiber through a clearance between the first and second dies. The clearance is sufficiently small so that substantially no circulation of the second coating liquid occurs in the vicinity of the point of application to the fiber. The second coating liquid which is applied includes a free surface in the immediate vicinity of the point of application to the fiber.

Notwithstanding the success of the above-identified C. R. Taylor arrangement, efforts have continued to apply a coating material to an optical fiber as the fiber is being moved at higher and higher manufacturing line speeds. Wanted is a system in which a coating material need not be maintained at a particular level and which does not require the system to hold a relatively large quantity of coating material that must be removed prior to cleaning and other maintenance. Further, it long has been a desire to improve the stringing up of an optical fiber on a draw tower and to reduce the amount of cooling which the optical fiber must experience after being drawn but prior to being coated.

Seemingly, the prior art does not include a coating arrangement which applies two coatings within a single applicator at relatively high line speeds, and which facilitates the string-up of the optical fiber with reduced cooling prior to coating. The sought-after methods and apparatus for coating should be easily and inexpensively implemented.

SUMMARY OF THE INVENTION

The foregoing problems have been overcome by the methods and apparatus of this invention. In accordance with methods of this invention, after an optical fiber has been drawn from a preform, it is moved through a chamber in a housing. A pressure differential is established between the chamber and the ambient atmosphere outside the housing. Then successive increments of length of the optical fiber are moved past a disc-like flow path which has at least a component that is normal to the path of travel of the optical fiber and then through a die opening which is substantially larger than the cross-sectional area of the optical fiber. As a result of the cooperation among the pressure feed of the coating material, the speed at which the fiber is moved, the size of the die opening and the normal component of the flow path, the coating material as it leaves the flow path and is directed toward engagement with the fiber becomes bounded by free surfaces. The pressure differential not only allows the free surfaces to exist but also avoids the formation of bubbles in the coating material. The coating material is caused to be flowed along the flow path in a direction generally radially inwardly toward the path of travel of the optical fiber into engagement with the optical fiber as it is moved throught the die opening.

In a preferred embodiment, the pressure differential is established by connecting the chamber to a source of vacuum. Further, in the preferred embodiment, two vacuum chambers, one after the other, in the path of travel of the optical fiber, are used. This arrangement enhances the bubble-free characteristics of the coating material, particularly when dual coatings are being applied to the moving optical fiber.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
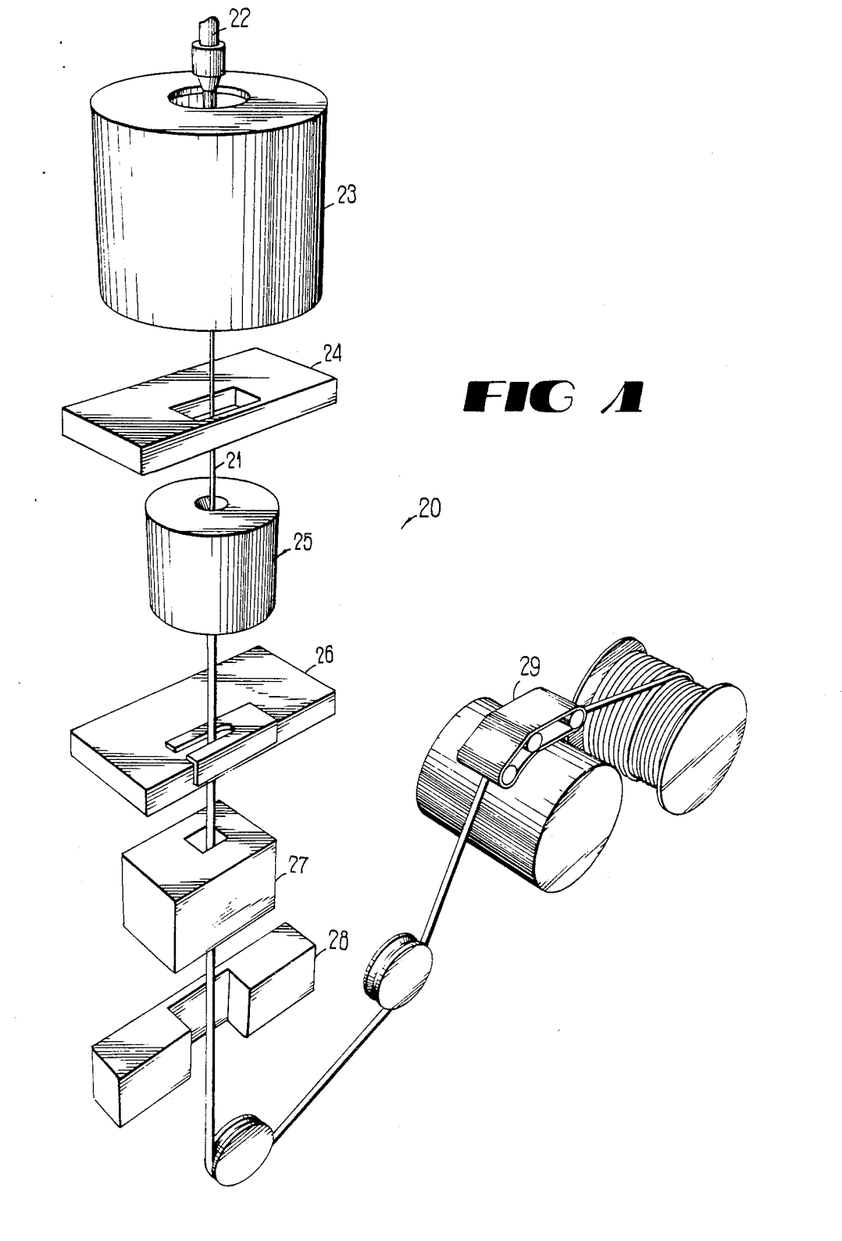
FIG. 1 is an overall perspective view of a portion of a manufacturing line on which optical fiber is drawn from a preform and covered with one or more coatings of a polymeric material.

Referring now to FIG. 1, there is shown an apparatus which is designated generally by the numeral 20 and which is used to draw an optical fiber 21 from a specially prepared cylindrical preform 22 and then to coat the optical fiber. The optical fiber 21 is formed by locally and symmetrically heating the preform 22 which typically is about 17 mm in diameter and 60 cm in length to a temperature of about 2000° C. As the preform 22 is fed into and through a furnace 23, optical fiber 21 is drawn from the molten material.

As can be seen in FIG. 1, the draw system includes the furnace 23, wherein the preform 22 is drawn down to the fiber size, after which the optical fiber 21 is pulled from the heat zone. The diameter of the optical fiber 21 which is measured by a device 24 at a point shortly after the furnace 23 becomes an input into a control system. Within the control system, the measured diameter is compared to the desired value and an output signal is generated to adjust the draw speed such that the fiber diameter approaches the desired value.

After the diameter of the optical fiber 21 is measured, a protective coating or coatings is applied by an apparatus 25 of the invention. Then, after the coated optical fiber 21 is passed through a centering guage 26, a device 27 for treating the coating material and a device 28 for measuring the outer diameter of the coated fiber, it is moved through a capstan 29 and is spooled for testing and storage prior to subsequent operations or sale. The preservation of the intrinsically high strength of optical fibers is important during the ribboning, jacketing, connectorization and cabling of the optical fibers and during their service lives.

Preservation of fiber strength requires the application of a protective coating, which shields newly drawn optical fiber from the deleterious effects bf the atmosphere. This coating must be applied in a manner that avoids damage to the surface of the optical fiber 21. For example, should the optical fiber 21 be off-centered with respect to the coating apparatus, damage to the fiber surface which can have an adverse effect on the fiber strength and result in microbending losses may occur during the coating processes. The optical fiber must have a predetermined diameter and be protected from abrasion during subsequent manufacturing operations, installation and service. Minimizing attenuation requires the selection of a suitable coating material and a controlled application of it to the optical fiber 21. It is important that the layer or layers of coating material be disposed concentrically about the optical fiber.

Figure 2:
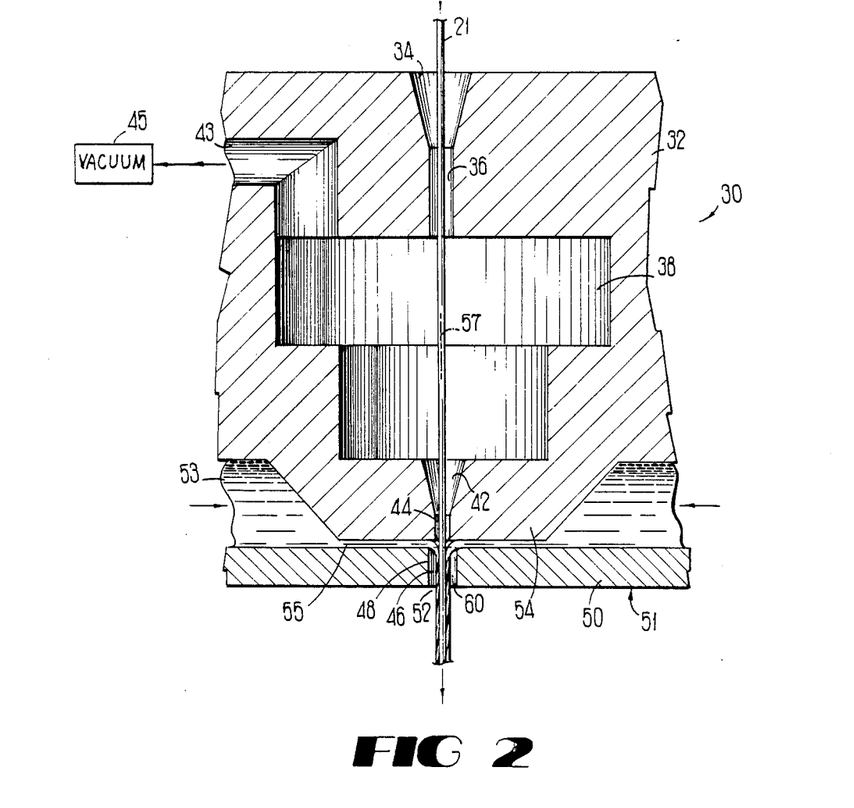
FIG. 2 is an elevational view in section of an apparatus for applying a single layer of a coating material to a moving optical fiber.
Figure 3:
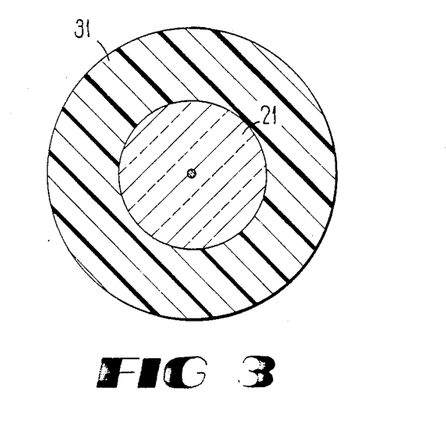
FIG. 3 is an end cross-sectional view of an optical fiber which includes a single layer of a coating material.

Referring now to FIG. 2, there is shown a coating applicator, which is designated generally by the numeral 30, for applying a single layer 31 (see FIG. 3) of coating material to a moving optical fiber. The applicator 30 includes a housing 32 having a flared entrance 34 and a cylindrically shaped passageway 36. The passageway 36 opens to a chamber 38. A lower end of the chamber 38 communicates with a flared exit 42 which communicates with another cylindrical passageway 44.

A pressure differential is established between the chamber 38 and ambient atmosphere wit the latter exceeding the former. In a preferred embodiment, the chamber 38 is connected along a conduit 43 to a source of vacuum 45.

The passageway 44 is aligned with and spaced from another cylindrical passageway or die opening 46 (see FIGS. 2 and 4) defined by a wall 48 which is called a land. The land 48 is provided in a block 50 of a die 51 which includes an exit or die opening 52. It is important that the diameter of the passageway 44 is less than that of the passageway 46. Typically, the passageway 46 has a diameter which is equal about to the product of 1.5 and the outer diameter of the optical fiber. On the other hand, the diameter of the passageway 36 may be greater than that of the passageway 46.

As used herein, the term "die" denotes that portion of the applicator which last confines or aids in confining a given coating layer around the fiber. Unlike some prior art apparatus, it does not necessarily determine directly the size of the coating layer.

The applicator 30 is used to apply a single layer 31 of a coating material 53 (see FIG. 2) to an optical fiber 21. For example, the drawn optical fiber 21 has an outer diameter of about 125 $\mu$m and includes a layer 31 of a coating material which has an overall diameter of about 250 $\mu$m.

Figure 4:
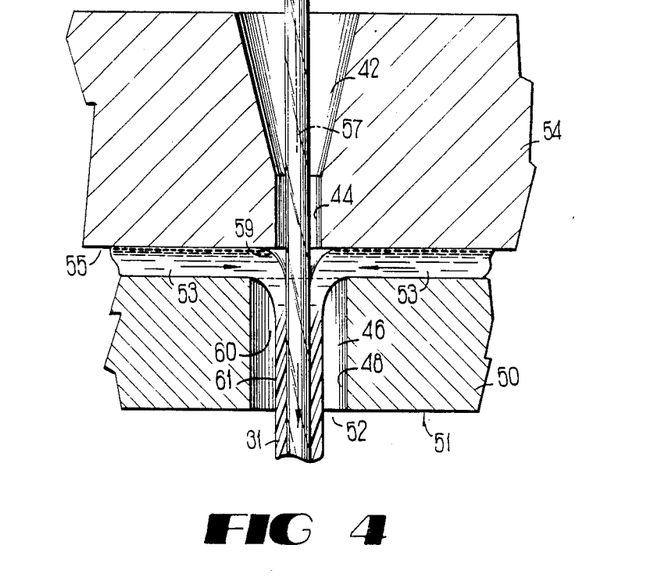
FIG. 4 is a detail view of a portion of the apparatus of FIG. 2.

As can be seen in FIGS. 2 and 4, the die block 50 is spaced through a clearance from a portion 54 of the housing 32 in which is provided the flared exit 42 to provide a flow path 55 having a disc-shaped configuration. The flow path 55 is defined between the portion 54 of housing and the die block 50. Such a disc-like flow path is shown in earlier mentioned C. R. Taylor U.S. Pat. No. 4,474,830 and in U.S. Pat. No. 4,512,944 which issued on Apr. 23, 1985 in the names of G. Astfalk, et al., both of which patents are incorporated by reference hereinto.

The clearance is such that at least a component of the flow path is normal to the path 55 of travel of the optical fiber 21. In a preferred embodiment, the flow path 55 is normal to a vertical longitudinal axis 57 of the apparatus 30. That dimension of the clearance which is parallel to the path of travel of the optical fiber along the axis 57 in the vicinity of the point of application of the coating material is referred to as its thickness and typically is less than three times the fiber diameter. Preferably, the clearance is less than twice the optical fiber diameter.

The small thickness of the clearance or flow path in the direction of the path of travel of the optical fiber is desirable in order to prevent the formation of eddys in the coating material 53 which is flowed along the flow passage 55 from a source (not shown). Such an eddy or recirculation current can cause undesirable instabilities which may result in the formation of bubbles in the layer 31 of coating material.

The normality of the disc-like flow passage 55 to the optical fiber 21 in the preferred embodiment is beneficial from several standpoints. This allows the end surface of the portion 54 of the housing to be a broad surface which is desirable for accurate adjustment of the clearance to obtain a uniform flow onto the fiber 21. This design also eases significantly mechanical tolerances in machining elements of the apparatus 30 to obtain a passage of the desired shape in the desired location compared to designs wherein an inner end of a die is an edge formed by the intersection of a land and a diagonal surface. Furthermore, the blunt end of the present design makes it much less fragile, and thus less subject to damage than sharp edge designs.

During the operation of the coating applicator 30 in the preferred embodiment, the chamber 38 is connected along the line 43 to the source of vacuum 45. Typically, the line 43 is substantially larger than the passageway 36 to restrict the inflow of air. For example, the diameter of the line 43 may be as much as the product of ten and the diameter of the passageway 36. A suitable coating material 53 is flowed along the flow passage 55 into engagement with successive increments of length of the optical fiber 21 which are being moved through the coating applicator. In one embodiment, the pressure at the exit of the die block 50 is 14.7 psia whereas that in the passageway 44 adjacent to the flow path 55 is about 1 psia. Advantageously, the vacuum is effective to prevent air from being drawn along the moving optical fiber and becoming entrained as bubbles in the layer of coating material. Without this effective evacuation procedure, a mass of bubbles form in the vicinity of the die. The use of the vacuum causes the tubular column to be stable.

Further, the draw rate of the optical fiber 21, the pressure of the coating material 53, the diameter of the land 48 and the normal component of the flow path 55 cooperate so that a gap 60 (see FIGS. 2 and 4) is formed between the coating material on the optical fiber and the land. In this manner, the coating material has a "free surface" 61 (see particularly FIG. 4), that is, it is unconstrained by a solid surface in the immediate vicinity of the point at which the coating material is applied to the optical fiber. Also, a free surface 59 is allowed to be maintained and oriented toward the passageway 44. The free surfaces 61 and 59 which define a membrane of the coating material 53 after it emerges from the disc-like flow path 55 and is directed toward engagement with the moving optical fiber are allowed to be maintained because of the pressure differential, despite what may be a relatively thin membrane as the coating material 53 turns from the flow path 55 and is caused to be directed downwardly to engage the moving optical fiber 21. Without this, a mass of bubbles will occur in the vicinity of the membrane and cause its collapse, resulting in a filling of the die opening 46 and of a portion of the passageway 44.

As a result of this arrangement, the coating material 53 accelerates to the velocity of the moving optical fiber 21 by elongational flow in the vicinity of the free surfaces. There are no abrupt changes in the velocity of the coating material 53 as it is being applied to the moving optical fiber 21. This arrangement avoids the establishment of a shear field between the coating liquid on the moving optical fiber and the land 48 and reduces substantially the possibility of an recirculation and the consequent formation of air bubbles within the coating material. Because the surface tension of the coating material, which typically has a viscosity in the range of about 3500 cps, can support the pressure diffential which is formed across the free surfaces 59 and 61, the membrane defined between these two surfaces is maintained and is not penetrated.

The free surface 61 which is provided in the vicinity of the die opening not only avoids recirculation of the coating material but also is beneficial from the standpoint of the outer diameter of the coated optical fiber. Without the presence of a free surface, the outer diameter of the coated optical fiber is determined by the die opening and is fixed. With the arrangement of this invention, the diameter of the coated optical fiber may be changed by changing the pressure feed of the coating material 53.

The gap 60 extends into the die opening at least as far as the point of initial contact of the coating material with the optical fiber, and preferably to the upper end of the die land. Also, it should be noted that the coating material may contact the moving optical fiber well below the flow path 55.

As mentioned hereinbefore, it is frequently commonplace to apply dual coatings for a drawn optical fiber. These provide protection for the optical fiber, as well as render the optical fiber more flexible than with a single coating layer.

Figure 5:
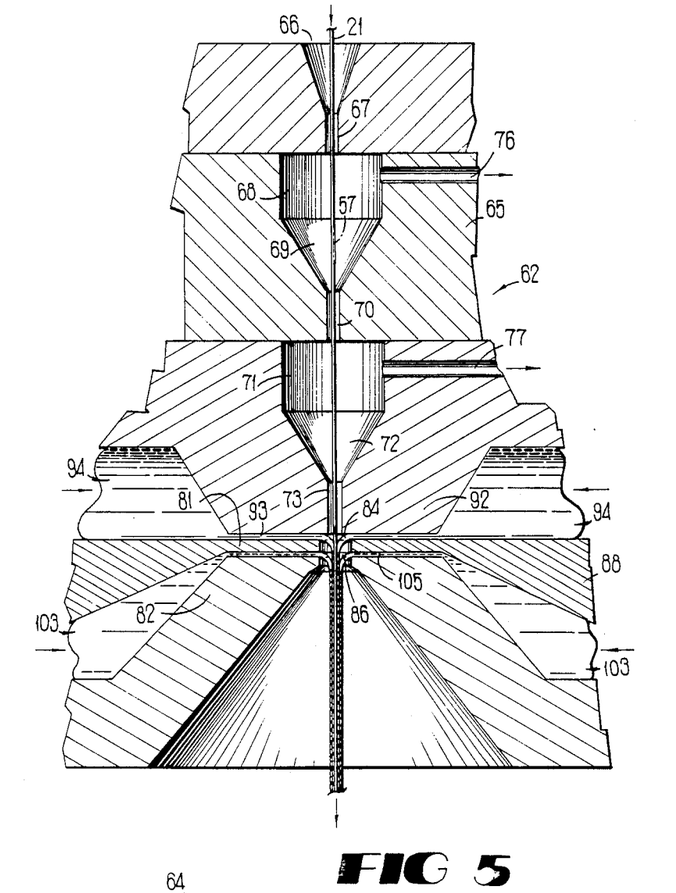
FIG. 5 is an elevational view in section of an apparatus of this invention for applying dual layers of coating materials to a moving optical fiber.
Figure 6:
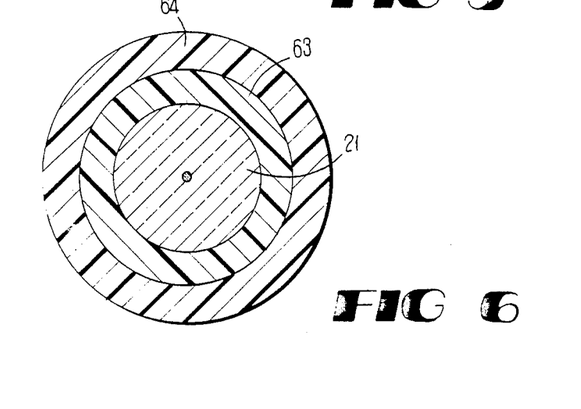
FIG. 6 is an end cross sectional view of an optical fiber which includes dual layers of coating materials.

Going now to FIG. 5, there is shown a preferred embodiment of a coating applicator 62 of this invention for applying dual layers of coating materials to a moving optical fiber. An optical fiber 21 having dual layers of coating materials 63 and 64 thereon is shown in FIG. 6.

The coating applicator 62 includes a housing 65 having a flared entrance 66 into which successive increments of the optical fiber 21 are advanced. The flared entrance 66 connects to a cylindrical passageway 67 which opens to a first chamber 68. A lower portion 69 of the first chamber 68 is conically shaped and communicates with a cylindrical passageway 70 which opens to a second chamber 71. A lower portion 72 of the second chamber 71 is conically shaped and communicates with a cylindrical passageway 73.

The applicator 62 is caused to be operated such that a pressure differential exists between the chambers 68 and 71 and the ambient atmosphere with the ambient pressure being greaater than that in the chambers. In a preferred embodiment, the chambers 68 and 71 are connected along lines 76 and 77, respectively, to a source of vacuum (not shown in FIG. 5).

Aligned with the cylindrical passageways 67, 70 and 73 are first and second dies 81 and 82 having die openings 84 and 86 respectively. It should be observed that the die openings 84 and 86 (see also FIG. 7) which are associated with the first and second dies, respectively, have a substantially larger diameter than those of the passageway 73. On the other hand, the diameters of the passageways 67 and 70 can be larger or smaller than those of the die openings. However, in a preferred embodiment they are relaively small to inhibit the inflow of air.

Furthermore, the appicator is arranged to provide flow paths for two coating materials. A die block 88 of the first die 81 includes a surface 89 which is parallel to and spaced from a surface 91 of a portion 92 of the housing. The clearance between the surfaces 89 and 91 define a flow path 93 for a first coating material 94 which provides the cushioning layer 63 for the optical fiber. The flow path 93 has at least a component that is normal to the path of travel of the optical fiber along the longitudinal axis 57. In a preferred embodiment, the flow path 93 is disk-like and is normal to the path of travel of the optical fiber. Further, the thickness of the flow path 93 in a direction parallel to the path of travel of the optical path is relatively small, being on the order of about 2 to 10 mils.

Also, a second coating material 103 is pressure fed along a flow path 105 formed between surfaces 107 and 109 of the dies 81 and 82 over the first coating material 94 and between the first coating material and a land 110 of the second die. The flow path 105 also has at least a component that is normal to the path of travel of the optical fiber, and in the preferred embodiment is normal to the axis 59.

As in the application of a single coating to optical fiber, the thickness of the clearance in the intermediate vicinity of the point of application of the first coating liquid in the applicator 62 onto the optical fiber is typically less than three times the diameter of the fiber. For the flow path 105, the thickness also is less tha the product of three and the diameter of the optical fiber, and preferably less than 2 times the diameter. The small thickness is desirable to prevent the formation of an eddy of each coating liquid in the vicinity of the point of application. Such recirculation can cause undesirable instabilities and mixing about the optical fiber or with the previously applied first coating. In addition, for the reasons set forth hereinbefore during the description of a single coating to an optical fiber, it has been found desirable to form the clearance associated with the second die by surfaces perpendicular to the fiber axis 57. As a result, each coating liquid in its associated clearance region flows perpendicularly to the axis of fiber until entering the transition region in the immediate vicinity of the moving optical fiber.

Figure 7:
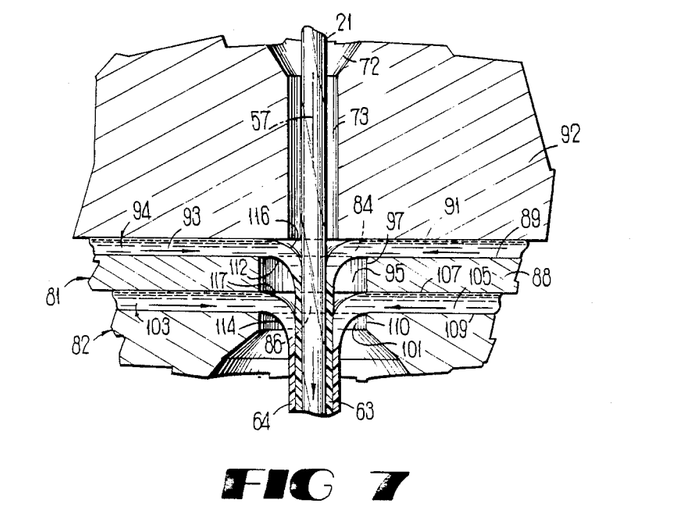
FIG. 7 is a detail view of a portion of the apparatus of FIG. 5.

In the arrangement shown in FIGS. 5 a 7, an optical fiber 21 is passed through the first coating die 81 and thereafter into the second coating die 82 located near the exit of the first die. The chambers 68 and 71 are connected along conduits 76 and 77 to a source of vacuum. To restrict the inflow of air, the diameter of each of the passageways 67 and 70 is relatively small. Further, in order to facilitate removal of air from the chambers 68 and 71, the diameters of the conduits 76 and 77 are relatively large. As a result, in the preferred embodiment, these parameters are such that the ratio of each of the diameters of the conduits 76 and 77 to the diameters of the passageways 67 and 70, respectively, is about ten to one. The first coating liquid 94 is pressure fed along the flow path 93 onto the optical fiber through the clearance formed between the surfaces 89 and 91 and the second coating material 103 is pressure fed along the flow path 105.

The fiber draw rate, the pressure feed of the coating materials and the diameter of the aperture of the die around the optical fiber together with the direction of the flow path are chosen so that a gap forms between the first coating material and the land of the die 81 and between the second coating material and the land of the die 82. The aperture of each die is chosen so that for a given fiber draw rate, coating liquid pressure and direction of the flow path with respect to the axis 57, a gap forms between the optical fiber and the die or between the coated fiber and the die. In this manner, each coating liquid is preferably applied onto the optical fiber or onto the inner layer of coating material through a membrane bounded by free surfaces, that is, unconstrained by a solid surface in the immediate vicinity of the point at which the first coating material is applied to the optical fiber or at which the second coating material is applied to the first coating. Each gap desirably extends into the aperture of die at least as far as the initial point of contact of the coating liquid with the moving substrate. In this manner, instabilities and nonuniformities associated with prior art techniques are eliminated substantially. As can best be seen in FIG. 7, a gap 95 is formed between the first coating material and a land 97 of the first die. Also, a gap 101 is formed between the second coating material and a land 110 of the second die. These gaps function in the same manner as the gap 60 in FIG. 2.

The gaps 95 and 101 are effective to allow free surfaces 112 and 114 to be formed between the coating materials 94 ad 103 and the lands 97 and 110, respectively Also, it should be noted that free surfaces 116 and 117 are formed and cooperate with the free surfaces 112 and 114, respectively, to define membranes of the coating materials 94 and 103, respectively, after they emerge from their respective flow paths and are directed toward the optical fiber 21. These gaps are allowed to develop because of the pressure differentials between the chambers and ambient atmosphere. Without those pressure differentials, masses of bubbles will form about the juncture of the moving optical fiber 21 and the coating liquids, destroying the membranes bounded by free surfaces and causing the die openings to be filled with the coating materials.

As in the single coating application, the presence of a free surface in the die opening avoids the development of a shear field between the associated land and the moving optical fiber. This is particularly important in the second die where the shear field would develop between the layer of first coating material and the second which would disrupt the layer already on the optical fiber. The formation of the gaps helps provide for a smooth transition in the flow of the coating liquids onto the optical fiber and onto the first or inner layer coating material in the region of the dies. It also helps to decouple the gap from any irregularities in the flow of the coating liquids.

Each coating liquid in the present technique accelerates to the fiber velocity by elongational flow in the vicinity of the free surfaces, and there are thus no abrupt changes in the coating liquid velocity as it is applied to the fiber and to the first coating. This technique avoids shear between the first coating material and the land 97 and between the first and second coating liquids and the land 110, thereby substantially reducing the possibility of mixing between the first and second coating liquids. Once the coating process has reached a stable, steady state condition, the gaps are substantially isolated from the atmosphere and at least partially evacuated. This is because the first coating liquid in the upper portion of the die forms a hermetic seal on one side, whereas the second coating liquid likewise forms a hermetic seal on the other side of the applied first coating in the vicinity of the gap 101. This is very advantageous in reducing the possibility of bubble entrapment in the second coating material, because there is no contact with the atmosphere that would allow for bubble entrapment between the first and second coatings.

A further advantage is derived from the formation of the gaps 95 and 101. Because of them, the diameter of the coated optical fiber may be adjusted by adjusting the pressure feed of the coating materials 94 and 103. Adjustablility is not available in a fixed die which is filled by the coating material. Also in such fixed die arrangements, the position of the optical fiber within the die opening and the pressure level must be maintained accurately otherwise bubbles may result and the coating liquid from the disc-like flow path may back up in the passageway 44 or the passageway 73.

In the apparatus 62, with the pressure for the first coating material adjusted as noted above for a given fiber line speed, the diameter of the optical fiber is enclosed in a layer of the first coating material is determined mainly by the feed pressure of the first coating material. Also, the thickness of the layer of second coating material can readily be adjusted by changing the feed pressure of the second coating material. A desirable feature of the present technique is that the first and second coating thicknesses each can thus be independently adjusted. Because the coating materials are introduced by a pressure feed through rigid orifices, a uniform concentric thickness of the coatings can be maintained. A further advantage relates to centering of the fiber in the coating. Once the comosite structure is centered, both layers of coating materials are concentric about the optical fiber. A convenient way of centering the fiber in the coating applicator is described in "The Centering Of Optical Fiber Coatings By Monitoring Forward-Scattering Patterns, Theory And Practice," by B. R. Eichenbaum in the *Bell System Technical Journal,* Vol 59, page 313 (1980).

One of the advantages of the methods and apparatus of this invention relates to string-up of the optical fiber. Under previous arrangements, an optical fiber had to be pushed blindly through a coating liquid in the applicator cup and through the die opening therein, particularly after the run of an initial preform. Herein, there is not coating liquid reservoir in the housing but only in the flow passages. As a result, string-up of the optical fiber is far easier for an operator.

Furthermore, there are no operating windows to maintain for the coating materials. In neither system, that for the single layer coating nor that for the dual layers, is there a reservoir level in the applicator that must be maintained. Also, because there is no reservoir of coating material in the applicator, it becomes far easier to clean the applicator and to perform other maintenance procedures thereon.

Another advantage of the methods and apparatus of this invention relates to the reduced cooling of the drawn fiber which is necessary before it is moved into the coating appicator. The air adjacent to the moving optical fiber functions as a heat sink. As its temperature rises, so does its viscosity which increases the probability for entrainment into the liquid coating material. Also, the higher the temperature of the optical fiber, the greater the reduction in the vicosity of the coating liquid adjacent to the fiber. This can have an adverse effect on the coating process. For example, it may become more difficult to maintain a particular coating liquid level in an entry die such as is shown in the hereinbefore identified C. R. Taylor patent thereby resulting in the loss of a hermetic seal which if present helps to prevent the entrainment of air. Therefore, in prior art arrangements, it becomes necessary to reduce the line speed of the optical fiber or to use enhanced cooling so that the fiber is cooler when it entered the coating applicator.

This problem is overcome by the methods and apparatus of this invention. Because of the established pressure differential, there is substantially no air in the passageway 44 of the applicator 30 or in the passageway 73 of the dual applicator 62 to undergo an increase in viscosity and none to be entrained. Further, because of the relatively short time the optical fiber is in contact with a coating liquid, prior to it forming a layer or layers on the optical fiber, there is insufficient time for the viscosity of the coating material to be reduced appreciably. Less cooling of the drawn optical fiber is necessary and higher line speeds may be used.

It should be understood that the above-described arrangements are simply illustrative of the invention. Other arrangements may be devised by those skilled in the art which will embody the principles of the invention and fall within the scope and spirit thereof.

What is claimed is:

1. A method of making an optical fiber having a layer of a coating material thereon, said method including the steps of:

drawing an optical fiber from a preform;

moving the drawn fiber along a path of travel into and through a chamber in a housing;

moving the optical fiber from the chamber past a disc-like flow path which has at least a component that is normal to the path of travel of the optical fiber and then through an opening of a die, the die opening being substantially larger than the diameter of the coated fiber;

establishing a pressure differential between the chamber and ambient atmosphere such that ambient pressure is greater than that in the chamber; while causing a coating material to be flowed along the flow path generally radially inwardly toward the path of travel and into engagement with the moving optical fiber to coat the fiber as it is moved through the die opening without any portion of the coating material being moved in a direction toward the chamber, the thickness of the flow path in a direction along the path of travel being such that substantially no recirculation of the coating material occurs in the vicinity of the application of the coating material to the optical fiber and further wherein the size of the die opening, the direction of the flow path and the steps of moving the drawn fiber and causing the coating material to be flowed along the flow path being such as to cause a gap to be formed between the coating material and an adjacent die surface and to cause the coating material as it exits the flow path and is flowed into engagement with the moving optical fiber to have a conically shaped membranous configuration which is bounded by free surfaces and which is maintained by said pressure differential;

curing the coating material on the optical fiber; and taking up the drawn, coated optical fiber.

2. The method of claim 1, wherein the disc-like flow path has a thickness which is less than three times the largest cross sectional dimension of the optical fiber and the disc-like flow path is bounded by surfaces which are perpendicular to the path of travel of the optical fiber.

3. The method of claim 1, wherein the gap extends into the die opening at least as far as the point at which the coating material first contacts the optical fiber.

4. A method of making an optical fiber having a layer of a coating material thereon, said method including the steps of:

drawing an optical fiber from a preform;

moving the drawn fiber along a path of travel into and through a chamber in a housing;

moving the optical fiber from the chamber past a first disc-like flow path, a first die opening, a second disc-like flow path and then through a second die opening, each of the flow paths having at least a component that is normal to the path of travel of the optical fiber and each of the die openings being substantially larger than the cross-section of the optical fiber;

applying a source of vacuum to the chamber; while causing first and second coating materials to be flowed along the first and second flow paths, respectively, generally radially inwardly toward the path of travel of the optical fiber to coat the fiber as it is moved through the first and then through the second die opening without any portion of the first and second coating materials being moved in a direction toward the chamber, the thickness of each flow path in the direction of the path of travel being such that substantially no recirculation of the coating material flowing therein occurs in the vicinity of the application of the coating material to the optical fiber and wherein the steps of moving the optical fiber and causing the coating materials to be flowed and the die openings and the directions of the flow paths are such that a gap forms between each of the coating materials and an associated die surface with each coating material as it exits the flow path and are such that as each coating material is flowed into engagement with the moving optical fiber said each coating material has a conically shaped membranous configuration which is bounded by free surfaces and which is maintained by the vacuum while it is applied to the chamber;

causing the first and the second coating materials which enclose the optical fiber to be cured; and taking up the drawn, coated optical fiber.

5. The method of claim 4, wherein each of the disc-like flow paths has a thickness which is less than three times the diameter of the optical fiber and is bounded by surfaces which are perpendicular to the path of travel of the optical fiber.

6. The method of claim 4, wherein each of the gaps extends into the associated die opening at least as far as the point at which the associated coating material first contacts the optical fiber.

7. The method of claim 4, wherein the drawn optical fiber is moved through a first chamber and then through a second chamber prior to the application of the coating material thereto.

8. A method of coating an optical fiber, said method including the steps of:

moving an optical fiber along a path of travel into and through a chamber in a housing;

moving the optical fiber from the chamber past a disc-like flow path which has at least a component that is normal to the path of travel of the optical fiber and then through an opening of a die, the die opening being substantially larger than the diameter of the coated fiber;

establishing a pressure differential between the chamber and ambient atmosphere such that ambient pressure is greater than that in the chamber; while causing a coating material to be flowed along the flow path generally radially inwardly toward the path of travel into engagement with the moving optical fiber to coat the fiber as it is moved through the die opening, the thickness of the flow path in a direction along the path of travel being such that substantially no recirculation of the coating material occurs in the vicinity of the application of the coating material to the optical fiber and wherein the size of the die opening, without any of the coating material being moved in a direction toward the chamber, the direction of the flow path and the steps of moving the drawn fiber and causing the coating material to be flowed along the flow path are such as to cause a gap to be formed between the coating material and an adjacent die surface with the coating material as it exits the flow path and as it is directed into engagement with the moving optical fiber and to cause the coating material to have a conically shaped membranous configuration which is bounded by free surfaces and which is maintained by said pressure differential; and curing the coating material on the optical fiber.

9. A method of coating an optical fiber, said method including the steps of:

moving an optical fiber along a path of travel into and through a chamber in a housing;

moving the optical fiber from the chamber past a first disc-like flow path, a first die opening, a second disc-like flow path and then through a second die opening, each of the flow paths having at least a component that is normal to the path of travel of the optical fiber and each of the die openings being substantially larger than the cross-section of the optical fiber;

applying a source of vacuum to the chamber; while causing first and second coating materials to be flowed along the first and second flow paths, respectively, generally radially inwardly toward the path of travel of the optical fiber to cat the fiber as it is moved through the first and then through the second die opening without any portion of the coating materials being moved in a direction toward the chamber, the thickness of each flow path in the direction of the path of travel being such that substantially no recirculation of the coating material flowing therein occurs in the vicinity of the application of the coating material to the optical fiber and wherein the steps of moving the optical fiber and causing the coating materials to be flowed and the die openings and the directions of the flow paths are such that a gap forms between each of the coating materials and an associated die surface with each coating material as it exits the flow path and are such that as it is directed into engagement with the moving optical fiber the coating material is bounded by free surfaces which are maintained by the vacuum that is applied to the chamber; and curing the coating material on the optical fiber.

10. An apparatus for making an optical fiber having a layer of a coating material thereon, said apparatus including:

means for drawing an optical fiber from a preform;

a housing which includes a chamber;

a die having an opening which is aligned with said chamber and which is substantially larger than the diameter of the optical fiber;

moving means for advancing the drawn fiber along a path of travel into and through the chamber in the housing and through said die opening;

means for establishing a pressure differential between said chamber and ambient atmosphere such that the ambient pressure exceeds that in said chamber;

guiding means spaced interposed between said chamber and said die opening and including a disc-like flow path which has at least a component which is normal to the path of travel of the optical fiber for directing a coating material toward engagement with the moving optical fiber;

feeding means for causing a coating material to be flowed along the flow path radially inwardly toward the path of travel into engagement with the optical fiber to coat the fiber as it is moved through said die opening, the thickness of the flow path in the direction of the path of travel being such that substantially no recirculation of the coating occurs in the vicinity of the application of the coating material to the optical fiber and wherein said moving means and said feeding means, the diameter of said die opening and the direction of said flow path are such as to cause a gap to be formed between the coating liquid and the adjacent die surface and to cause the coating material as it exits the flow path and is flowed into engagement with the moving optical fiber to have a conically shaped membranous configuration which is bounded by free surfaces and which is maintained by said pressure differential;

means for curing the coating material on the optical fiber; and means for taking up the drawn, coated optical fiber.

11. The apparatus of claim 10, wherein the disc-like flow path has a thickness which is less than three times the diameter of the optical fiber.

12. The apparatus of claim 10, wherein the disc-like flow path is bounded by surfaces which are perpendicular to the path of travel of the optical fiber.

13. The apparatus of claim 10, wherein the gap extends into the die opening at least as far as the point at which the coating material first contacts the optical fiber.

14. The apparatus of claim 10, wherein said chamber is a first chamber and said apparatus also includes a second chamber which is aligned with said first chamber, each of said chambers being connected to a source of vacuum.

15. The apparatus of claim 10, wherein said die opening has a diameter which is equal about to the product of 1.5 and the diameter of the coated optical fiber.

16. An apparatus for making an optical fiber having first and second layers of coating material thereon, said apparatus including:

means for drawing an optical fiber from a preform;

a housing which includes a chamber;

means for establishing a pressure differential between said chamber and ambient atmosphere such that the ambient pressure is substantially greater than that in said chamber;

a first die including a die opening which is substantially larger than the diameter of the optical fiber;

a second die including a die opening which is substantially larger than the diameter of the optical fiber;

moving means for advancing the optical fiber into and through said chamber along a path of travel and through said first and then through said second die openings;

first flow passage means disposed between said first die opening and said chamber and including a first disc-like flow path which has at least a component that is normal to the path of travel for directing a first coating material into engagement with the moving optical fiber;

first feeding means for causing the first coating material to be flowed along said first flow path radially inwardly toward the path of travel and then into engagement with the optical fiber to coat the fiber as it is being moved through said first die opening without the flow of any of the first coating material in a direction toward said chamber the thickness of the flow path in a direction along the path of travel being such that substantially no recirculation of the first coating material occurs in the vicinity of the application of the first coating material to the optical fiber and wherein said moving means and said feeding means together with the diameter of said first die opening and the direction of said first flow path are such that a first gap forms between the first coating material and an adjacent surface of said first die with the coating material and such that as it exits the flow path and is directed into engagement with the moving optical fiber, the coating material has a conically shaped membranous configuration bounded by free surfaces and maintained by said pressure differential;

second flow passage means disposed betweens said first and second die openings and including a second disc-like flow path which has at least a component that is normal to the path of travel for directing a second coating material radially inwardly toward the path of travel into engagement with the first coating material on the optical fiber; and second feeding means for causing the second coating material to be flowed along the second flow path radially inwardly toward the path of travel and then into engagement with the optical fiber to coat the fiber as it is moved through said die opening without any of the second coating material being moved in a direction toward said chamber, the thickness of the second flow path in a direction along the path of travel being such that substantially no recirculation of the second coating material occurs in the vicinity of the application of the second coating material to the coated optical fiber and wherein the movement of the optical fiber and said second feeding means together with the size of said second die opening and the direction of said second flow path are such that a second gap forms between the second coating material and an adjacent surface of said second die with the second coating material as it exits the second flow path and is directed into engagement with the first coating material on the moving optical fiber having a conically shaped membranous configuration which is bounded by free surfaces;

means for curing the first and second coating materials which enclose the optical fiber; and means for taking up the drawn, coated optical fiber.

17. The apparatus of claim 16, wherein the first disc-like flow path has a thickness which is less than three times the diameter of the optical fiber and the thickness of the second flow path is less than the product of three and the diameter of the optical fiber.

18. The apparatus of claim 16, wherein each of the disc-like flow paths is bounded by surfaces which are perpendicular to the path of travel of the optical fiber.

19. The apparatus of claim 16, wherein the first gap extends into the first die opening at least as far as the point at which the first coating material first contacts the optical fiber and the second gap extends into the second die opening at least as far as the point at which the second coating material first contacts the first coating material on the optical fiber.

20. The apparatus of claim 16, wherein said chamber is a first chamber and said apparatus includes a second chamber which is aligned with said first chamber and disposed between said first chamber and said first die opening and through which the optical fiber is advanced, each of said chambers being connected to a source of vacuum.

21. The apparatus of claim 19, wherein said apparatus includes a first passageway which provides entry into said first chamber, a second passageway connecting said first and second chambers and a third passageway which connects said second chamber to said first die.

22. The apparatus of claim 20, wherein the diameter of said first die opening is greater than that of said third passageway.

23. The apparatus of claim 21, wherein the diameter of said second die opening is at least equal to the diameter of said first die opening.

24. An apparatus for coating an optical fiber, said apparatus including:

a housing which includes a chamber;

a die having an opening which is aligned with said chamber and which is substantially larger than the diameter of the fiber;

moving means for advancing the optical fiber along a path of travel into and through the chamber in the housing and through said die opening;

means for establishing a pressure differential between said chamber and ambient atmosphere such that the ambient pressure exceeds that in said chamber;

guiding means interposed between said chamber and said die opening and including a disc-like flow path which has at least a component which is normal to the path of travel of the optical fiber for directing a coating material into engagement with the moving optical fiber;

feeding means for causing a coating material to be flowed along the flow path radially inwardly toward the path of travel and then into engagement with the optical fiber to coat the fiber as it is moved through said die opening without any of the coating material being moved in a direction toward said chamber, the thickness of the flow path in the direction of the path of travel being such that substantially no recirculation of the coating occurs in the vicinity of the application of the coating material to the optical fiber and wherein said moving means and said feeding means, the diameter of said die opening and the direction of said flow path are such as to cause a gap to be formed between the coating liquid and the adjacent die surface and to cause the coating material as it exits the flow path and is directed into engagement with the moving optical fiber to have a conically shaped membranous configuration which is bounded by free surfaces and which is maintained by said pressure differential; and means for curing the coating material on the optical fiber.

* * * * *